United States Patent Office 3,304,279
Patented Feb. 14, 1967

3,304,279
RESINOUS POLYMER DISPERSION AND METHOD
OF MAKING THE SAME
Erik R. Nielsen, Des Plaines, and Edwin A. Swire, Elmhurst, Ill., assignors to Mono-Sol Corporation, Chicago, Ill., a corporation of Delaware
No Drawing. Continuation of application Ser. No. 465,755, Oct. 29, 1954. This application Mar. 11, 1963, Ser. No. 264,019
6 Claims. (Cl. 260—30.6)

This application is a continuation of an application by the same inventors filed October 29, 1954, and given Serial No. 465,755, which was, in turn, a continuation-in-part of an earlier application by the same inventors filed May 26, 1954, and given Serial No. 432,587. Both of said prior applications have now been abandoned. This invention relates to the preparation of dispersions and the dispersions so obtained. More particularly, the invention relates to the preparation of dispersions of polymeric thermoplastic resinous material in organic media which dispersions are especially adapted for casting of films and to the dispersions so obtained and the films produced therefrom.

One of the more significant of the recent advances in the field of thermoplastic resins, and more particularly vinyl resins, has been the development of methods of applying these resins in the form of dispersions or suspensions. One suspension of this type comprises a finely divided resin, a dispersant which aids in the wetting and dispersing of this resin, and a diluent which serves to provide the desired viscosity.

It is well known that there are distinct advantages to the use of dispersions of this type in the application of various types of thermoplastic resins, particularly vinyl resins. One application in which these resin dispersions have particular advantage is in the preparation of unsupported films of the resin by band casting. Readily volatile diluents may be employed in the dispersion and these evaporate rapidly in the band casting machine, after which continued heating completes fusion of the resin particles into a continuous self-supporting film of resin. In making the dispersion a plasticizer of the kind and in the amount desired in the completed film is employed in the dispersant for the resin and thus remains in the film after the evaporation of the diluent.

Heretofore in the making of such dispersions of polymeric resins it has been thought necessary to first form the polymeric resin by emulsifying or dispersing the appropriate monomer or monomers in an aqueous medium, and then polymerizing the monomer, to the polymeric resin form in the dispersion medium. The polymer must then be separated from the aqueous medium and preferably collected in finely divided form. This finely divided resin material is then mixed with the dispersing medium consisting of dispersant and diluent and ground in the presence of this medium to form the dispersion of polymeric resin in an organic medium.

Although these dispersions are important to the successful band casting of polymeric resin films, they have one distinct disadvantage when prepared by the methods heretofore used, which are described above. The resin particles have associated with them a residue of the wetting or dispersing agent employed in the aqueous dispersion in which the polymer is formed and this material in the cast film tends to produce an undesirable cloudiness. No method has been devised to date for completely eliminating this wetting agent problem. In addition, the procedure heretofore used for making such dispersions of polymeric resins has the disadvantage that it is relatively costly, laborious and time consuming in that the polymer, after it is formed, has to be recovered from the medium in which it is formed and then ground and redispersed in the organic dispersing medium.

It is an object of this invention to provide a new type of dispersion of a thermoplastic resinous polymer in an organic medium and a new method of making the same.

It is a further object of this invention to provide a polymeric resin dispersion of the foregoing type which has improved utility in the band casting of films of the polymeric resin and produces films having improved properties.

Still another object of the invention is to provide a new, less costly and less laborious method of making dispersions of thermoplastic resinous polymers in organic media.

A still further object of the invention is to provide an improved and direct method of making polymeric resin films from resin monomers including a band casting step.

Still another object is to provide a new type of dispersion of a thermoplastic resinous polymer in an organic medium which dispersion is useful for all the various purposes for which the heretofore known dispersions of thermoplastic resinous polymers in organic media are useful.

A still further object is to provide a direct method of making dispersions of thermoplastic resinous polymers in organic media which dispersions are useful for all the various purposes for which the heretofore known dispersions of thermoplastic resinous polymers in organic media are useful.

Other objects will appear hereinafter.

It has now been found that the foregoing objects are accomplished by dispersing the appropriate monomeric material in a medium consisting essentially of a dispersant and a diluent which volatilizes readily at a temperature below the softening point of the polymeric material. Dispersants are organic liquids which are swelling agents for the polymer. Many of the dispersants have a strong swelling action on the polymer. Dispersants thus include many plasticizers for the polymer. In accordance with the present invention, the dispersant may contain any desired amount of plasticizer from a minimum of zero percent of the weight of the dispersant to a maximum of 100% thereof. The diluent is a solvent for the dispersant and has little or no swelling action on the polymer.

Since the dispersant and particularly any portion thereof which is a plasticizer for the polymer is inclined primarily for its effect on the polymer rather than the monomer it is within the scope of the invention to initiate the polymerization before all of the dispersant has been added and to add some or all of the dispersant thereafter. Such later additions may be made in increments during the polymerization if desired.

Preferably, also, the dispersion contains a suitable polymerization catalyst and may, if desired, contain other materials which it is desirable to have present during the polymerization or which confer desired properties on the dispersion to be made or the film to be produced therefrom. The monomer is then polymerized at room temperature or any other desired temperature to produce the desired dispersion. Whatever polymerization temperature is used, however, it is preferable to control the temperature carefully during polymerization to obtain the desired polymer products. It is also preferable to maintain the composition in a state of vigorous agitation during polymerization. This aids materially in maintaining control over the temperature and also tends to minimize agglomeration or depositing of polymer particles on the walls of the reaction vessel.

It is found that polymerization under the foregoing conditions produces polymer in sufficiently finely divided form so that, upon completion of the polymerization, a homogeneous product is obtained in which the polymeric resin material is well dispersed. Self-supporting films of the polymeric resin material are readily cast from these dispersions by any desired method including band casting. The films produced from these dispersions possess a high degree of clarity and exhibit none of the cloudiness characteristics of the films produced from dispersions prepared by methods previously known.

In order that the invention may be better understood, the following detailed examples are given. These examples, however, are to be construed as illustrative only and not as limiting the scope of the invention. In each of the following examples the polymerization is conducted at approximately 50° C.

*Example 1*

Mixtures having the compositions indicated in Table 1 below are prepared by first dissolving 0.5 percent of benzoyl peroxide, by weight, based on the weight of the vinyl chloride, in the dioctyl phthalate, the cyclohexane is then added followed by a slight excess of vinyl chloride. The mixtures are suitably agitated to assure uniform distribution. The various mixtures are each placed in a round bottomed pressure bottle and the excess vinyl chloride is bubbled off to sweep the air out of the bottles. These bottles are placed vertically in a horizontal reciprocating shaker moving at 250 cycles/min. The polymerization is accelerated with ultraviolet light.

TABLE 1

| Vinyl Chloride (weight percent) | Dioctyl Phthalate (DOP) (weight percent) | Cyclohexane (weight percent) | Vinyl Chloride: DOP | Solids (weight percent) |
|---|---|---|---|---|
| 20.0 | 10.0 | 70.0 | 2:1 | 30.0 |
| 33.3 | 16.7 | 50.0 | 2:1 | 50.0 |
| 21.4 | 8.6 | 70.0 | 2.5:1 | 30.0 |
| 28.6 | 11.4 | 60.0 | 2.5:1 | 40.0 |
| 35.8 | 14.2 | 50.0 | 2.5:1 | 50.0 |
| 42.8 | 17.2 | 40.0 | 2.5:1 | 60.0 |
| 22.5 | 7.5 | 70.0 | 3:1 | 30.0 |
| 37.5 | 12.5 | 50.0 | 3:1 | 50.0 |

Polymerization in the shaker is continued for 112 hours. Each of the mixtures shown in the table yields a fluid suspension at the end of this time, although some solid material has deposited in the necks of the bottles. When this solid material is pushed into the body of the suspension and the mixture shaken, the deposits are resuspended. A clear film cast from the suspension obtained with the mixture containing 50% solids and vinyl chloride and dioctyl phthalate in the ratio of 2.5:1, exhibits a high degree of clarity and is comparable in other properties with vinyl chloride films produced by other procedures.

*Example 2*

Mixtures having the compositions indicated in Tables 2 and 3 below are prepared as described in Example 1 except that, in preparing the mixtures in Table 2, 0.2% of benzoin, based on the weight of the monomer, is dissolved in the dioctyl phthalate along with the benzoyl peroxide catalyst and, except that, in preparing the mixtures in Table 3, the same amount of benzoin is dissolved in the dioctyl phthalate and lauroyl peroxide is used as the catalyst instead of benzoyl.

TABLE 2

| Vinyl Chloride (weight percent) | Dioctyl Phthalate (DOP) (weight percent) | Cyclohexane (weight percent) | Vinyl Chloride: DOP | Solids (weight percent) |
|---|---|---|---|---|
| 28.6 | 11.4 | 60 | 2.5:1 | 40 |
| 35.8 | 14.2 | 50 | 2.5:1 | 50 |
| 42.8 | 17.2 | 40 | 2.5:1 | 60 |

TABLE 3

| Vinyl Chloride (weight percent) | Dioctyl Phthalate (DOP) (weight percent) | Cyclohexane (weight percent) | Vinyl Chloride: DOP | Solids (weight percent) |
|---|---|---|---|---|
| 28.6 | 11.4 | 60 | 2.5:1 | 40 |
| 35.8 | 14.2 | 50 | 2.5:1 | 50 |
| 42.8 | 17.2 | 40 | 2.5:1 | 60 |

The polymerization is carried out in the manner described in Example 1, with shaking and ultraviolet light acceleration, but is discontinued after 45 hours. The products obtained are similar to those obtained in Example 1.

*Example 3*

Mixtures having the compositions indicated in Table 4 below are prepared by dissolving alpha, alpha'-azodiisobutyronitrile in the dioctyl phthalate in the amount of 0.5%, by weight, based on the weight of the vinyl chloride. The cyclohexane is then added and finally a slight excess of vinyl chloride is mixed in. Suitable agitation is provided to assure uniform distribution. Each of the compositions so prepared is placed in an autoclave equipped with a stirrer producing vigorous agitation and the slight excess of vinyl chloride is evaporated off to displace the air in the autoclave.

TABLE 4

| Vinyl Chloride (weight percent) | Dioctyl Phthalate (DOP) (weight percent) | Cyclohexane (weight percent) | Vinyl Chloride: DOP | Solids (weight percent) |
|---|---|---|---|---|
| 28.6 | 11.4 | 60 | 2.5:1 | 40 |
| 35.8 | 14.2 | 50 | 2.5:1 | 50 |
| 42.8 | 17.2 | 40 | 2.5:1 | 60 |

Polymerization is carried out in the autoclave under pressure until it is complete. The stirrers are operated throughout this period to maintain vigorous agitation. Dispersions result which are similar to those obtained in Example 1.

*Example 4*

A mixture of vinyl chloride monomer and vinyl acetate monomer in the ratio of 92.5 to 7.5 is employed in place of the single monomer used in the preceding examples. Alpha, alpha'-azodiisobutyronitrile in the amount of 0.5%, by weight, based on the weight of the monomers, is dissolved in the quantities of dioctyl phthalate indicated in Table 5 below. The quantities of hi-flash naphtha indicated are then added to each of the mixtures followed by the appropriate quantities of the vinyl acetate and a slight excess of vinyl chloride. The compositions are thoroughly mixed to produce good distribution and are placed in round bottomed pressure bottles. When the excess of vinyl chloride has been bubbled off to displace the air in the bottles, the bottles are placed on a horizontal shaker reciprocating at 250 cycles/min. and polymerization is carried out as described in Example 1 under ultraviolet light acceleration.

TABLE 5

| Vinyl Monomers (weight percent) | Dioctyl Phthalate (weight percent) | Hi-flash Naphtha (weight percent) | Vinyl Monomers: DOP | Solids (weight percent) |
| --- | --- | --- | --- | --- |
| 28.6 | 11.4 | 60 | 2.5:1 | 40 |
| 35.8 | 14.2 | 50 | 2.5:1 | 50 |
| 42.8 | 17.2 | 40 | 2.5:1 | 60 |

Polymerization to the desired solids content is complete in approximately 12 hours. The products are similar to those obtained in Example 1 except that in the suspended polymer resin material the vinyl chloride polymer of Example 1 is replaced with a copolymer of vinyl chloride and vinyl acetate.

Using the procedure illustrated in the above examples, this invention may be applied to the preparation of dispersions from a wide variety of monomeric materials which are capable of being polymerized to thermoplastic polymers. Particularly good results are obtained with vinyl type compounds. The invention, moreover, is applicable not only to single monomers but also to the polymerization of mixtures of monomers in any desired proportions.

Similarly, any desired dispersant or mixture of dispersants may be employed. Many suitable plasticizers are well known to those skilled in the art and need not be set forth specifically. By way of illustration, however, it is pointed out that in place of the dioctyl phthalate used as an illustration herein, such diverse plasticizers as tricresyl phosphate, dicapryl phthalate, dibutyl sebacate, dioctyl sebacate, dioctyl phthalate, di(2-ethylhexyl)hexahydrophthalate, di(2-ethylhexyl) tetrahydrophthalate, polyethylene glycol di(2-ethylhexoate), di(2-ethylhexyl) adipate, and diethylene glycol dibenzoate may be employed. In like manner a wide variety of non-plasticizing dispersants may be used as desired either in combination with or instead of part or all of the plasticizer. Suitable dispersants of this type include methyl isobutyl ketone, diisobutyl ketone, isophorone, 2-ethylhexyl acetate, n-butyl acetate, methylamyl acetate, 2-ethylbutyl acetate, trimethyl nonanone, ethylene glycol monoethyl ether acetate ("Cellosolve" acetate), and ethylene glycol monoethyl ether acetate (methyl "Cellosolve" acetate). In the dispersion as distinguished from films produced therefrom the effect of dispersants of the non-plasticizing type is very similar to that of the plasticizing dispersants, as pointed out above. Nevertheless, in providing a balance between dispersant and diluent it is generally desirable to treat each different combination of ingredients individually. The ratio of dispersant to diluent which provides minimum viscosity generally depends upon the specific composition of the dispersant.

It is also within the scope of the invention to employ any desired diluent or mixture of diluents. The diluents are relatively volatile organic materials, usually hydrocarbons, which are blended with the dispersants to minimize the thinner cost, to decrease the viscosity of the resulting dispersion and to control, if necessary, the solvating and swelling action on the polymer by the dispersant. Other diluents which may be used in accordance with this invention include xylene, 2-ethylhexyl alcohol, naphthenic hydrocarbons, naphtha fractions (high flash).

Dispersions containing from 30 to 50% or more by weight of polymeric resin material are readily prepared in accordance with the present invention. The solids content of these dispersions may run up to as high as 60% or more when the solids consist of polymer and plasticizer (plasticizer even though liquid is considered a portion of the solids since it remains in films prepared from the dispersion) and even higher when other solids such as pigments are included.

As pointed out above, the dispersions of this invention are quite complex colloidal systems. The formulation of these dispersions to obtain the maximum benefit of the use of this system requires considerable care. The advantage of these dispersions is that they can be formulated so as to be fluid compositions with very high solids content and relatively low viscosity.

As is known, in order to take full advantage of this characteristic, it is necessary to bear in mind that while for each combination of diluent and dispersant there is a range of compositions in which a particular polymeric resin material will remain dispersed, within this range the viscosity, stability and flow characteristics of the dispersion are controlled by the balance between the dispersant and the diluent. Furthermore, there is an optimum ratio between a given dispersant and diluent which yields a dispersion of lowest viscosity for a specific polymeric resin content. Increasing or decreasing the proportion of either dispersant or diluent above or below this optimum generally tends to increase the viscosity. More particularly, addition of diluent to a dispersion formulated at the optimum viscosity will often cause flocculation of the polymer particles and while addition of dispersant within reasonable limits may improve the stability of the system, larger excesses in addition to increasing the viscosity will often cause gelation.

The general principles set forth above in respect to the formulation and characteristics of the dispersions which form the subject matter of this invention are well known to those skilled in the art and need not be set forth in detail in this specification. Charts and formulation diagrams for various polymeric resinous materials, dispersants and diluents are available and these, together with the principles set forth above, will enable those skilled in the art to work out suitable dispersion compositions both as to components and the proportions thereof which may be prepared in accordance with this invention. As indicated by the above examples, the dispersion formulations which may be prepared in accordance with this invention are generally similar to those heretofore prepared by first forming the resinous polymer in an aqueous medium and then collecting it and dispersing it in an organic medium.

Polymerization may be carried out at any desired pressure and/or temperature, although pressure and temperature are interelated when the polymerization temperature is at or above boiling point of the monomer or mixtures of monomers employed. In general, the polymerization temperatures employed in accordance with this invention are those which are used in other types of systems for the particular monomer or monomers to be polymerized, ranging preferably from room temperature to about 50° C. and usually between about 40° C. and about 50° C. Since in certain instances at least the rate of polymerization in the systems which form the subject of this invention is somewhat lower than in other systems heretofore used, it is generally preferred to employ polymerization temperatures which are in the upper range of those which produce polymers of the desired molecular weight, it being well known that increasing the polymerization temperature although it increases the rate of polymerization also generally tends to decrease the average molecular weight of the polymeric material obtained. As indicated by the above examples, good results have been obtained by carrying out the polymerization at or about room temperature, although, as indicated, temperatures above or below room temperature may be employed if desired.

Control of the temperature is important particularly when somewhat elevated temperatures are employed because of the effect of temperature on the nature of the polymerization products. Moreover, temperature is not easy to control in these reactions because they are in general exothermic. Any desired means for controlling temperature may be employed but it has been found that whatever other expedients are employed, adequate agitation as described hereinafter aids materially in maintaining the polymerization temperature under control both as regards uniformity throughout the mass and as regards accurately maintaining the desired level of temperature.

Because it is a characteristic of the systems employed in accordance with this invention that the polymerization rate tends to be relatively low, it is also desirable to employ a relatively active catalyst, although in general any catalyst effective with the monomer and employed in other systems may be used in accordance with this invention. Any free radical catalyst or catalyst system may be used which gives adequate initiation in the particular composition in which the polymerization is to be carried out. The desired higher catalytic activity may be obtained by using compounds which produce a relatively high rate of polymerization or by other means illustrated in the above examples in which the activity of a catalyst such as benzoyl peroxide is accelerated by the use of ultraviolet light.

It is pointed out above that it is preferable to maintain the mixture undergoing polymerization in a state of vigorous agitation. This agitation aids not only in avoiding local effects and controlling temperature but also in producing the polymer in the uniformly finely divided form which is desirable in a dispersion of this type. The agitation may be produced in any desired way, for example, by shaking or by stirring as illustrated in the above examples, the latter being preferred. Other means of agitating the polymerizing mixture, however, are within the scope of the invention. For example, the mixture undergoing polymerization may be ball milled to provide the desired vigorous agitation by carrying out the polymerization in a ball mill or in an attritor.

In certain instances, even with relatively vigorous agitation, some agglomeration occurs and/or some polymer deposits on the walls of the reaction vessel. The polymer which deposits or becomes agglomerated can be broken up and resuspended in finely divided form by various means such as, for example, by ball-milling the product with or without adding additional diluent. Preferably additional diluent is added to provide an excess. Usually an hour or less in the ball-mill is sufficient to resuspend the deposited polymer. The dilution resulting from the addition of excess diluent is not a problem since a portion of the diluent can be readily evaporated with stirring without depositing the polymer and in this manner suspensions containing as high as 60% solids have been produced.

As disclosed hereinabove, various materials, in addition to the resin, dispersant and diluent, may be included in the dispersion either to improve the properties of the dispersion or the properties of the products, such as films, obtained from a dispersion, or both. Such materials would include stabilizers for the polymeric resinous material, as well as additions designed to improve or alter the appearance of a film prepared from the dispersion such as, for example, pigments. A wide variety of pigments may be incorporated in these dispersions and are preferably added by grinding after the polymerization has been completed. However, the addition of such materials usually requires some minor modifications in the dispersant diluent balance since a portion of the liquid present is generally required to wet and disperse the pigment itself. In general, the considerations which must be kept in mind in formulating the dispersions of this type previously known with the pigments are also applicable to the dispersions of the present invention.

The dispersions of this invention, being designed particularly for use in the band casting of plastic films, find their highest utility in this use. They are free of the wetting or dispersing agents used in aqueous dispersion media and thus films obtained from these dispersions lack the cloudiness characteristic of films prepared from polymers formed in aqueous media. It is not intended, however, to indicate that the utility of the dispersions of this invention is limited to the formation of films by band casting. To the contrary, these dispersions are useful for the same purposes for which similar dispersions heretofore known are suited, including but not limited to dipping processes, coating textiles and other materials, impregnating and molding.

Generally, in the art of band casting it is preferred to employ dispersions having a solids content of 40% or higher. Band casting is accomplished, as is well known to those skilled in the art, on apparatus such as is shown in the following United States Letters Patent granted to Edouard M. Kratz:

No. 2,294,915, issued September 8, 1942
No. 2,306,448, issued December 29, 1942
No. 2,316,173, issued April 13, 1943
No. 2,364,764, issued April 18, 1944
No. 2,346,765, issued April 18, 1944
No. 2,355,448, issued August 8, 1944
No. 2,421,073, issued May 27, 1947

A dispersion prepared as described in the above examples is ready for use in a mechanism of the type described in the foregoing patents and, to this end, is supplied to the receiving end of a sheet-making apparatus of this type. As described in the patents listed, a continuous belt moving past a doctor blade in front of which a small pool of the dispersion is maintained, picks up a thin coating of dispersion which is kept uniform by the doctor blade, after which this coating is carried through the oven provided in the sheet-making apparatus of the patents listed. In the oven the volatile portion of the dispersion is driven off and thereafter the continued heating in the oven causes the solids of the dispersion to fuse into a continuous film. This film is removed from the belt as described in the patents and is then ready for use.

It has been found that films cast from the dispersions prepared as described in the above examples have excellent physical properties. Among these properties is a high degree of clarity and excellent tensile strength. In contrast with the films prepared from dispersions previously known, the films obtained from the dispersions of this invention are clear and exhibit none of the cloudy appearance characteristic of films prepared from dispersions containing polymeric material formed in aqueous emulsion. The films prepared from the dispersions of this invention are comparable in physical properties to films prepared from dispersions previously known.

The films prepared from the dispersions of this invention, as well as the dispersions themselves, are useful for the same purposes for which dispersions of this type previously known and the films obtained therefrom have been found to be useful. Many of the advantages of the dispersions of this invention and the films obtained therefrom are apparent from the above description. For example, reference has been made to the fact that the dispersions and, more importantly, the films obtained therefrom, are free of wetting or dispersing agents which are effective in aqueous media. Residues of such material remaining in the polymeric resin tend to produce a cloudiness in transparent films which is most undesirable and the freedom of films obtained from the dispersions of this invention from such undesirable cloudiness is a decided advantage.

Another and distinct advantage of the invention is the saving in both time and money in the preparation of the dispersion. By virtue of the fact that it is possible to form the desired resinous polymer in the medium in which it is ultimately to be suspended to form the dispersion, the time and effort required to separate the resinous polymer from the medium in which it is formed according to methods previously known and resuspend it in an organic system is all saved.

We claim:

1. A method of making a dispersion of a resinous polymer in an organic medium which comprises forming a mixture including a monomer polymerizable to a thermoplastic resinous polymer, a catalyst for the polymerization of said monomer, an organic liquid dispersant which is a swelling agent for the polymer and a liquid diluent which is volatile at a temperature substantially below the fusion temperature of the resinous polymer and which is a solvent for the dispersant and has at most little swelling action on the polymer, polymerizing the monomer while it is present in the mixture to form the dispersion of a resinous polymer in an organic medium, vigorously agitating the mixture during the polymerization of the monomer, and after the polymerization is substantially complete ball-milling the product to suspend in finely divided form any polymer which is not in such finely divided suspended form at the end of the polymerization.

2. A method of making a dispersion of a resinous polymer in an organic medium which comprises forming a mixture including a monomer polymerizable to a thermoplastic resinous polymer, a catalyst for the polymerization of said monomer, an organic liquid dispersant which is a swelling agent for the polymer and a liquid diluent which is volatile at a temperature substantially below the fusion temperature of the resinous polymer and which is a solvent for the dispersant, and has at most little swelling action on the polymer, polymerizing the monomer while it is present in the mixture to form the dispersion of a resinous polymer in an organic medium, vigorously agitating the mixture during the polymerization of the monomer, and after polymerization is substantially complete adding additional diluent to the product to provide an excess of diluent and ball-milling the product with the excess diluent to suspend in finely divided form any polymer which is not in such finely divided suspended form at the end of the polymerization.

3. A method of making a film of a resinous polymer which comprises making a dispersion of a resinous polymer in an organic medium by forming a mixture including a monomer polymerizable to a thermoplastic resinous polymer, an organic liquid dispersant which is a swelling agent for the polymer and a liquid diluent which is volatile at a temperature substantially below the fusion temperature of the resinous polymer and which is a solvent for the dispersant and has at most little swelling action on the polymer, polymerizing the monomer while it is present in the mixture to form the dispersion of a resinous polymer in an organic medium, then spreading a thin continuous film of the dispersion on a moving endless belt and passing the belt with the film thereon through a zone of elevated temperature to evaporate the volatile portion of the dispersion and fuse the polymer and any plasticizer present into a thin continuous film.

4. A method as described in claim 3 further characterized in that at least a substantial portion of the dispersant is a plasticizer for the polymer.

5. A method as described in claim 3 further characterized in that the dispersant includes a plasticizer for the polymer in a quantity sufficient to give substantial flexibility to said thin continuous film formed on the belt.

6. A method of making a dispersion of a resinous polymer in an organic medium which comprises forming a mixture consisting essentially of a monomer polymerizable to a thermoplastic resinous polymer, a catalyst for the polymerization of said monomer, an organic liquid dispersant which is a swelling agent for the polymer and a liquid diluent which is volatile at a temperature substantially below the fusion temperature of the resinous polymer and which is a solvent for the dispersant and has at most little swelling action on the polymer, polymerizing the monomer while it is present in the mixture to form the dispersion of a resinous polymer in an organic medium and vigorously agitating the mixture during the polymerization of the monomer by ball milling the mixture.

References Cited by the Examiner

UNITED STATES PATENTS

| | | | |
|---|---|---|---|
| 2,160,054 | 5/1939 | Bauer | 260—89.5 |
| 2,732,357 | 1/1956 | Sprung | 260—31.2 |

MORRIS LIEBMAN, *Primary Examiner.*

L. T. JACOBS, *Assistant Examiner.*